June 10, 1930.   H. B. WHITLARK   1,762,905
PNEUMATIC TIRE
Original Filed Feb. 25, 1924   4 Sheets-Sheet 3

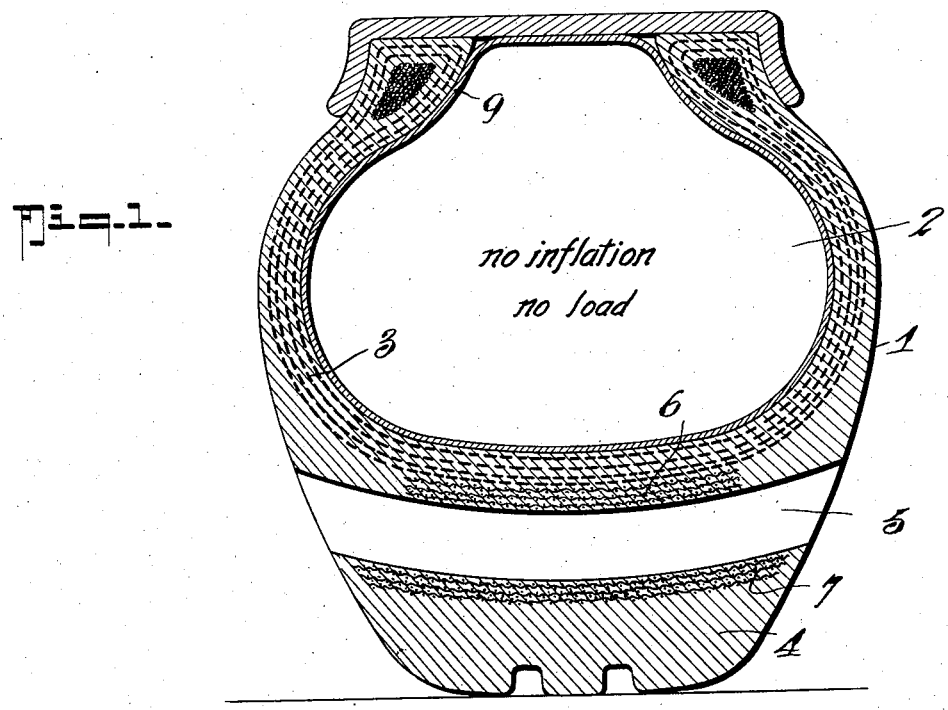
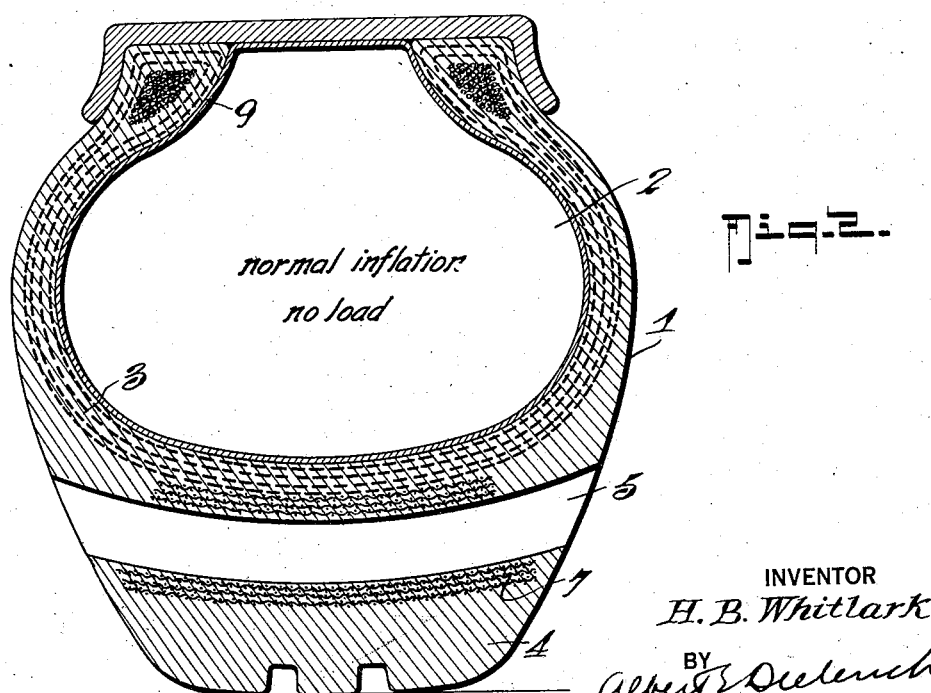

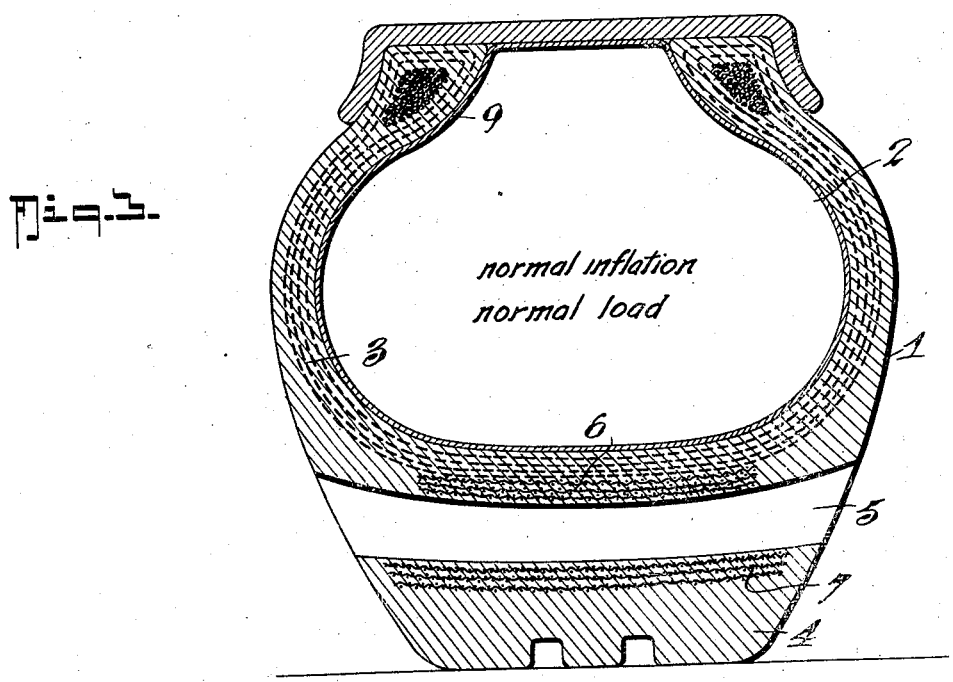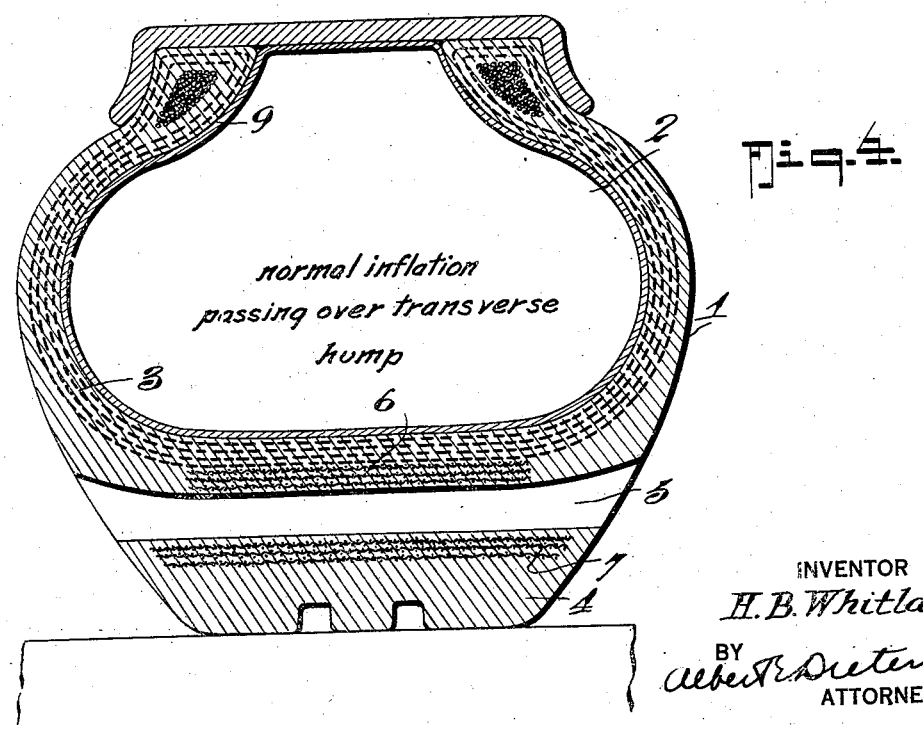

INVENTOR
H. B. Whitlark.
BY
ATTORNEY

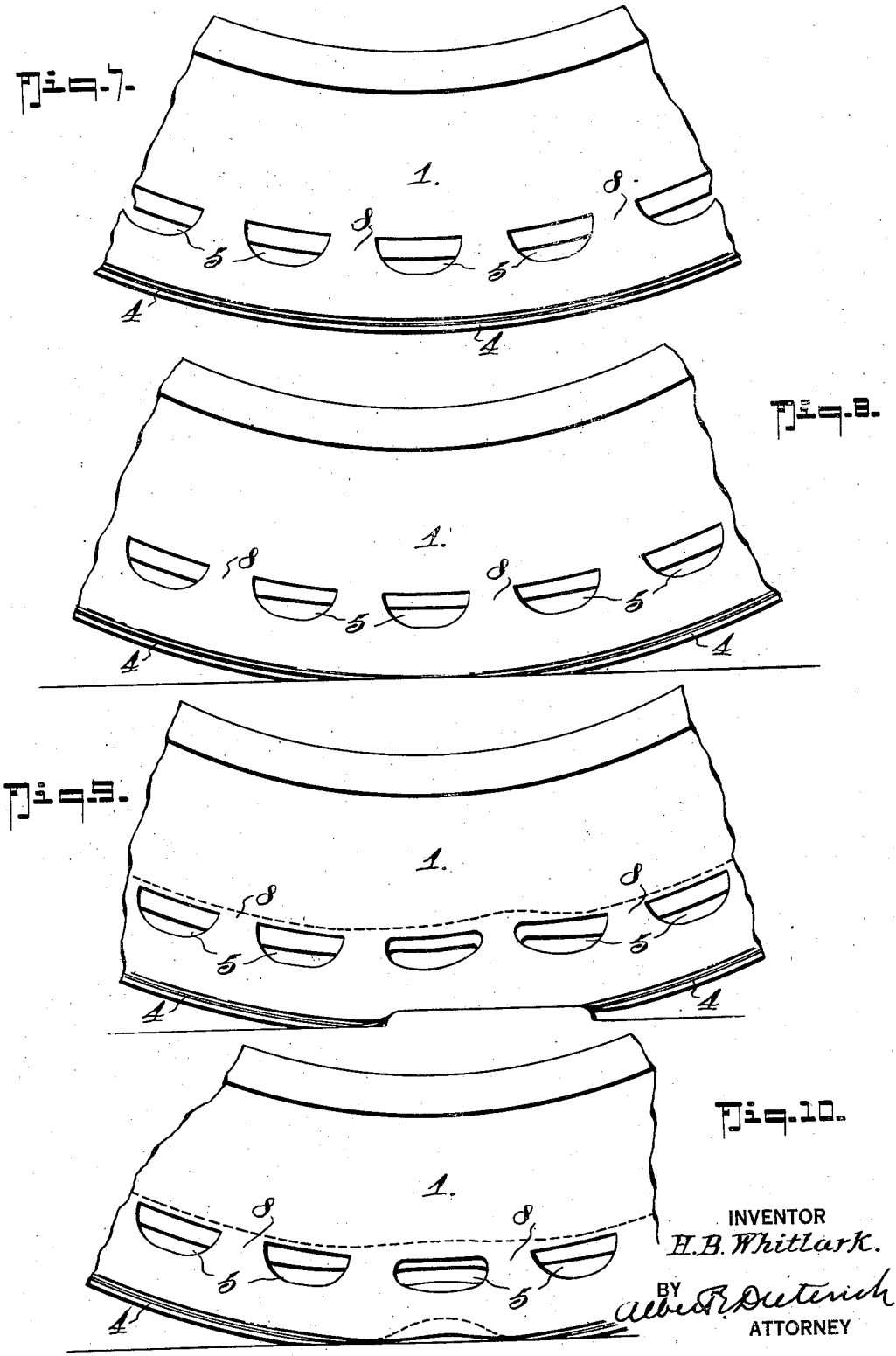

Patented June 10, 1930

1,762,905

UNITED STATES PATENT OFFICE

HENRY BENSON WHITLARK, OF TARBORO, NORTH CAROLINA, ASSIGNOR, BY MESNE ASSIGNMENTS, TO LAMBERT TIRE & RUBBER COMPANY, OF BARBERTON, OHIO, A CORPORATION

PNEUMATIC TIRE

Continuation of application Serial No. 695,013, filed February 25, 1924, refiled for abandoned application No. 330,205, filed October 13, 1919. This application filed July 10, 1926. Serial No. 121,680.

This invention relates to certain new and useful improvements in vehicle tires, and it has more particular reference to pneumatic tires.

The primary object of the invention is to provide a pneumatic tire which is puncture-proof to a large extent, practically blow-out proof, and which will ride much more easily than the tires now in use.

Another object of the invention is to provide a pneumatic tire in which the construction is such that the tread portion will be practically self-cooling, thereby prolonging the life of the tire.

A further object of the invention is to provide a pneumatic tire which is simple in construction, strong, durable, inexpensive to manufacture; and one in which the construction is such that there will be less liability of the rubber portion of the tire becoming separated or stripped from the carcass, which is an ordinary occurrence with tires now in use which have heavy tread portions.

Other objects and advantages of the invention will be apparent during the course of the following description.

In the accompanying drawings forming a part of this specification and in which like numerals are employed to designate like parts throughout the same Figure 1 is a cross section of a tire embodying my invention, taken substantially on the line 1—1 of Figure 6 showing the tire placed on a rim with inner tube inserted before inflation and under no load.

Figure 2 is a view similar to Figure 1 showing the tire under normal inflation but no load.

Figure 3 is a view similar to Figures 1 and 2 showing the tire under normal inflation and normal load.

Figure 4 is a view similar to Figures 1 to 3 showing approximately the action of the tire in passing over a transverse obstruction, such as a curb or rail, the tire being under normal inflation and normal load.

Figure 7 is a side elevation of a portion of the tire under normal inflation and no load (shown in Figure 2) on a reduced scale.

Figure 8 is a view similar to Figure 7 showing the tire under normal inflation and normal load (Figure 3).

Figure 9 is a view similar to Figures 7 and 8 showing the approximate action of the tire in passing over a curbing or rail obstruction (Figure 4).

Figure 10 is a side elevation similar to Figures 7, 8 and 9 showing approximately the action of the tire in passing over a stone (Figure 5).

Figure 5:
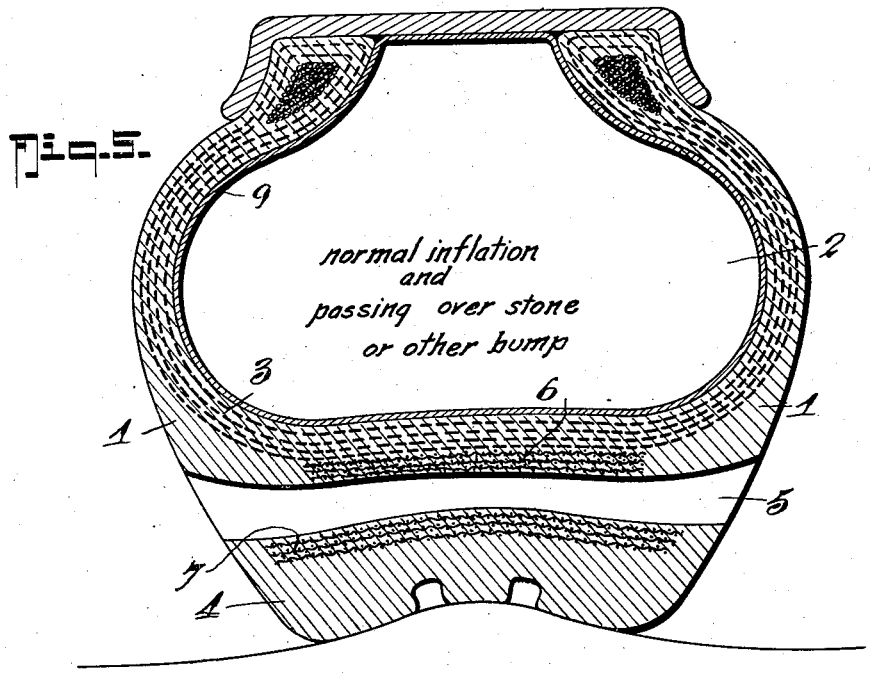
Figure 5 is a view similar to the preceding figures showing approximately the action of the tire in passing over a stone in the road.
Figure 6:
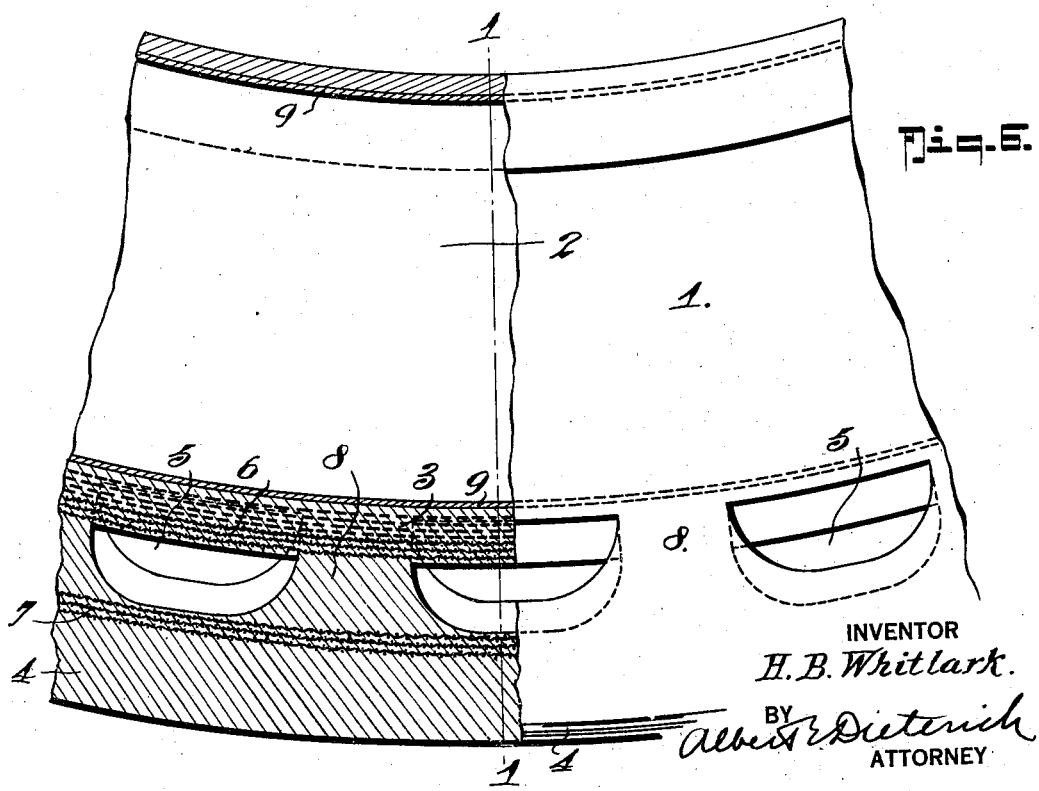
Figure 6 is a side elevation and part central vertical longitudinal section of a portion of the tire as shown in Figure 1, i. e., under no inflation and no load.

In the drawings, wherein for purposes of illustration, is shown a preferred embodiment of my invention, the numeral 1 designates the tire body as a whole, which is provided with the usual inner tube chamber 2 that is surrounded by a carcass structure 3, the outer side of this carcass being covered with rubber of insufficient thickness to form a cushion, whereby the inner tube carries the entire load as is usual in pneumatic tires.

The tread 4 of the tire is of greater thickness than in the ordinary tire practice, being equal to about one-third of the entire height, and it will prevent, to a great extent, nails and other pointed articles from passing through it and puncturing the inner tube 9 which is common with tires now in use. The tread is provided with a series of equally spaced openings 5 arranged around the entire circumference of the tire, and extending transversely of the tread portion forming spaced lugs or necks 8 which extend transversely of the periphery of the tread. These openings serve to cushion the tread 4, and in conjunction with the usual air cushion within the chamber 2, a tire of great resiliency will be had, thereby promoting easy riding of the tire. These openings 5 not only serve to make the tire more resilient and break up the traction wave which is largely responsible for tread separation, but they also serve to permit the passage of air therethrough which radiates the heat and tends to keep the tire cool. This feature will be found very advantageous when employed with tires having thick tread portions, because such tires become greatly over-heated.

Inserted in the tire at the juncture of the lugs and openings with the tread portion 4 and extending circumferentially around the tire, are non-biased or substantially stretchless fabric bands 7, and also embedded in the tire at the juncture of the lugs and openings with the periphery of the body 1, are other fabric bands 6 which likewise extend circumferentially. The bands 6 being disposed adjacent the inner walls of the openings 5 serve to flatten the inner tube chamber 2 and thereby prevent excessive expansion of the chamber 2 when the inner tube is inflated. On the other hand, the bands 7, which also contribute to prevent excessive expansion, being disposed adjacent the outer walls of the openings 5, prevent the rubber tread portion 4 from becoming stripped from the bands 7. In other words, it is well known that in the ordinary tire the tread is built around a fabric carcass which is very taut, and because of the failure of the carcass to yield when the tire is placed under certain lateral strains the tread oftentimes becomes stripped from the carcass and ruins the tire. With my construction this is not so, because the non-biased or substantially stretchless bands 7 are a great deal more yieldable than the ordinary tire carcass because of the cushion structure consisting of openings 5 and lugs 8 between this band and the carcass and for this reason there is little liability of the tread 4 becoming stripped from the bands 7. Inasmuch as the bands 6 are primarily intended to flatten the chamber 2 they need not be as wide as the bands 7 which are of a width approximately equal the width of the tread 4. The bands 6, by preventing excessive radial expansion of the carcass, prevent the side walls of the latter from pulling inwardly and exerting an injurious stretching action on the outer ends of the transverse rubber members 8.

I wish to point out here that the bands 6 are not built in as taut as the carcass 3, thus when the tire is inflated the bands 6 will stretch slightly and press the rubber necks outward thus resulting in tightening the bands 7 and compressing the rubber necks 8 between the bands 6 and 7. Hence, the rubber necks 8 will have no tendency to separate from the carcass because of their being held in by the tautness of the bands 6 and 7, and, as before stated, there will be less tendency of the tread 4 separating because it is vulcanized to the bands 7 which are more yielding than the carcass of an ordinary tire, these bands 7 being separated from the carcass 3 by the yieldable necks 8.

A tire of the above construction is punctureproof by reason of the thick tread portion 4. It is blowout proof by virtue of the fact that all sharp actions are absorbed in the tread portion with its circumferential bands 6 and 7 and transverse openings 5, and because of the peculiar construction of the tire, as before mentioned, the side walls and beads will be relieved, to a great extent, from lateral strains. Thus, through these various methods of protection furnished the tire, greater mileage will result, the tread being substantially thickened will cause longer wear, and beceause of the great resiliency of the tire easier riding qualities will be ensured.

Attention is further directed to the following:—I am, of course, aware that cushion tires have heretofore been constructed, embodying features such as a continuous tread ring with necks or lugs alternating with openings. However, by combining a cushion structure of this type with a pneumatic structure, such cushion structure derives different characteristics from those possessed by similar purely cushion structures. One of the most prominent changes in action is that the necks or lugs 8 are radially compressed in the improved tire, and in addition to having the advantages pointed out for this radial compression, the amount of action in the cushion structure is materially reduced. This is desirable as it reduces the amount of heat generated, thus more effectively cooling the tire. In this new type of tire the pneumatic feature is relied upon principally for resiliency, and the cushion structure primarily for obtaining other benefits as heretofore enumerated.

By having the necks and lugs under compression and thus reducing the amount of resilient action therein, I effect a large power saving. It is well known that the more action existing in a rubber cushion structure, the greater the power consumption when the tire is being driven on a car. By combining the cushion structure with the pneumatic structure and providing for the compression of the necks or lugs 8, however, the amount of action in the cushion tread portion is greatly decreased and hence a great saving in power is effected. By decreasing the action of the tread structure in this manner, I do not produce a tire that will have reduced resilient qualities, as the pneumatic tire provides for all required resiliency.

This application is a continuation of my application filed February 25, 1924, Serial No. 695,013, which latter application is one substituted for abandoned application Serial No. 330,205 filed by me October 13, 1919.

From the foregoing, it is thought the construction and advantages of my tire will be clear to those skilled in the art, and I wish it understood that slight changes in the details of construction can be made without departing from the spirit of the invention or the scope of the appended claims.

What I claim is:

1. In a pneumatic tire casing in which all parts are vulcanized together; a carcass adapted to receive an inner tube and expansible to a predetermined extent when the tube is inflated, a rubber tread ring surrounding and spaced from said carcass, transverse circumferentially spaced rubber lugs integral with said tread ring and interposed between said tread ring and the carcass, said lugs being joined also to said carcass, and a substantially non-stretching band embedded in said tread ring for restricting radial expansion of the tread ring to a greater degree than the carcass, whereby inflation of the tube and consequent expansion of the carcass will radially compress said lugs to a greater degree than their normal state of compression after vulcanizing, thereby preventing stripping thereof from the carcass.

2. In a thick tread pneumatic tire in which all parts are vulcanized together; a beaded carcass adapted to contain a tube, a wide flat band surrounding the tread portion of the carcass and restricting radial expansion under inflation, thereby not only restricting the diameter of the tire but forcing lateral expansion of the carcass to an appreciable extent beyond the beads, whereby an unusually wide tread portion is produced, a relatively thick rubber tread on said tread portion of the carcass and substantially equal in width to the transverse diameter of such carcass, said rubber tread comprising an outer tread ring and circumferentially spaced lugs joining the same to the portion of the tread contiguous to the carcass, a substantially non-stretching band in said tread ring for restricting radial expansion of said ring to a greater degree than the expansion of the first named band, whereby inflation of the tube and consequent expansion of the carcass will radially compress the aforesaid lugs to a greater degree than their normal state of compression after vulcanizing, and a rubber covering for the side walls of the carcass insufficient in thickness to act as a cushion thereby forcing the inner tube resiliently to carry the entire load.

3. In a pneumatic tire casing in which all parts are vulcanized together; a carcass having rim engaging beads and side walls extending laterally beyond said beads, said carcass having a greater diameter laterally than radially, permitting radial expansion when a tube within said carcass is inflated, a rubber tread ring surrounding and spaced from said carcass, transverse circumferentially spaced rubber lugs integral with said tread ring and interposed between the same and the carcass, said lugs being joined also to said carcass, and a substantially non-stretching band embedded in said tread ring adjacent its inner side for restricting radial expansion of the tread ring to a greater degree than the carcass, whereby inflation of the tube and consequent radial expansion of the carcass will radially compress said lugs to a greater degree than their normal state of compression after vulcanizing, thereby preventing stripping thereof from the carcass.

4. In a pneumatic tire casing in which all parts are vulcanized together; a carcass adapted to receive an inner tube and expansible to a predetermined extent when the tube is inflated, a rubber tread surrounding said carcass and having transverse circumferentially spaced openings entering from the sides of the tread thereby leaving transverse circumferentially spaced rubber lugs or pillars between adjacent openings, and a substantially non-elongatable band of flexible material embedded in said tread between said openings and the road-contacting face of the tread for restricting radial expansion of that portion of the tread which lies between the openings and pillars and the road-contacting face, whereby inflation of the tube and consequent expansion of the carcass will effect radial compression of the rubber lugs to a greater degree than their normal state of compression after vulcanizing.

5. In a pneumatic tire casing in which all parts beyond the rim beads are composed wholly of rubber and textile materials and are vulcanized together; a carcass composed of rubber and flexible fabric adapted to receive an inner tube and expansible to a predetermined extent when the tube is inflated, a flexible-in-all-directions tread of rubber surrounding said carcass and having transverse and circumferentially spaced openings thereby leaving transverse circumferentially spaced rubber lugs or pillars, that portion of the tread lying between the openings and the road-contacting face having provision for restricting radial expansion whereby inflation of the tube and consequent expansion of the carcass will effect radial compression of the rubber lugs or pillars to a greater degree than their normal state of compression after vulcanizing.

HENRY BENSON WHITLARK.